United States Patent
Lavery

(10) Patent No.: US 12,493,067 B1
(45) Date of Patent: Dec. 9, 2025

(54) NON-LINEAR FLITERING FOR PULSE DETECTION AND PULSE WIDTH DISCRIMINATION

(71) Applicant: BAE SYSTEMS Information and Electronic Systems Integration Inc., Nashua, NH (US)

(72) Inventor: Richard J. Lavery, Huntington, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 79 days.

(21) Appl. No.: 18/738,669

(22) Filed: Jun. 10, 2024

(51) Int. Cl.
*G01R 29/027* (2006.01)
*H03H 17/02* (2006.01)

(52) U.S. Cl.
CPC ..... *G01R 29/0273* (2013.01); *H03H 17/0202* (2013.01)

(58) Field of Classification Search
CPC .............................................. H03H 2017/0207
See application file for complete search history.

(56) References Cited

U.S. PATENT DOCUMENTS

| | | | |
|---|---|---|---|
| 5,349,525 A * | 9/1994 | Dunki-Jacobs | G01S 15/8981 600/453 |
| 5,410,498 A | 4/1995 | Staver | |
| 6,674,397 B2 | 1/2004 | Hager et al. | |
| 6,904,104 B1 | 6/2005 | Khullar et al. | |
| 7,522,658 B2 | 4/2009 | Jensen | |
| RE41,380 E | 6/2010 | McCallister et al. | |
| 8,270,460 B2 | 9/2012 | Dascher et al. | |
| RE43,963 E | 2/2013 | McCallister et al. | |
| 8,489,661 B2 | 7/2013 | Melanson | |
| 8,937,993 B2 | 1/2015 | Yu et al. | |

(Continued)

FOREIGN PATENT DOCUMENTS

| | | |
|---|---|---|
| EP | 1360761 A2 | 11/2003 |
| EP | 3968589 A1 | 3/2022 |
| WO | 2012106395 A1 | 8/2012 |

OTHER PUBLICATIONS

Wang, Leiou, "A New Fast Median Filtering Algorithm Based on Fpga," IEEE Explore, retrieved from the internet on Oct. 9, 2023. 4 Pages.

*Primary Examiner* — Jeffrey S Zweizig
(74) *Attorney, Agent, or Firm* — Scott J. Asmus

(57) ABSTRACT

Techniques are provided for non-linear filtering of a signal for improved pulse detection and pulse width discrimination. A system implementing the techniques according to an embodiment includes a first linear filter configured to filter an in-phase component of a received signal to a downsample bandwidth and a second linear filter configured to filter a quadrature phase component of the received signal to the downsample bandwidth. The system also includes a magnitude calculation circuit coupled to outputs of the first linear filter and the second linear filter and configured to generate a magnitude signal based on the filtered in-phase component and the filtered quadrature phase component of the received signal. The system further includes a median filter processor coupled to an output of the magnitude calculation circuit and configured to apply a median filter to the magnitude signal to generate a filtered signal having reduced noise while maintaining sharp edge transitions.

20 Claims, 7 Drawing Sheets

(56) References Cited

U.S. PATENT DOCUMENTS

| | | |
|---|---|---|
| 8,943,112 B2 | 1/2015 | Pagnanelli |
| 9,225,353 B2 | 12/2015 | Pagnanelli |
| 9,917,570 B2 | 3/2018 | Nikitin |
| 2005/0163249 A1 | 7/2005 | McCallister |
| 2007/0047673 A1 | 3/2007 | Xu et al. |

* cited by examiner

NON-LINEAR FLITERING FOR PULSE DETECTION AND PULSE WIDTH DISCRIMINATION

STATEMENT OF GOVERNMENT INTEREST

This invention was made with United States Government assistance under Contract Nos. FA8232 17 D 0027 and FA8232 21 F 0286. The United States Government has certain rights in this invention.

FIELD OF DISCLOSURE

The present disclosure relates to non-linear signal processing, and more particularly to non-linear filtering of a signal for improved pulse detection and pulse width discrimination.

BACKGROUND

Modern radar receivers are moving toward increased use of direct digital sampling of radio frequency (RF) signals, with log amplifier frontend components being replaced by linear amplifiers. Additionally, the direct digital sampling analog to digital converters (ADCs) for these systems operate over relatively wide bandwidths. The combination of linear amplifiers and increased bandwidth poses challenges for management of noise in the signal which can adversely affect pulse detection processing.

Figure 1:
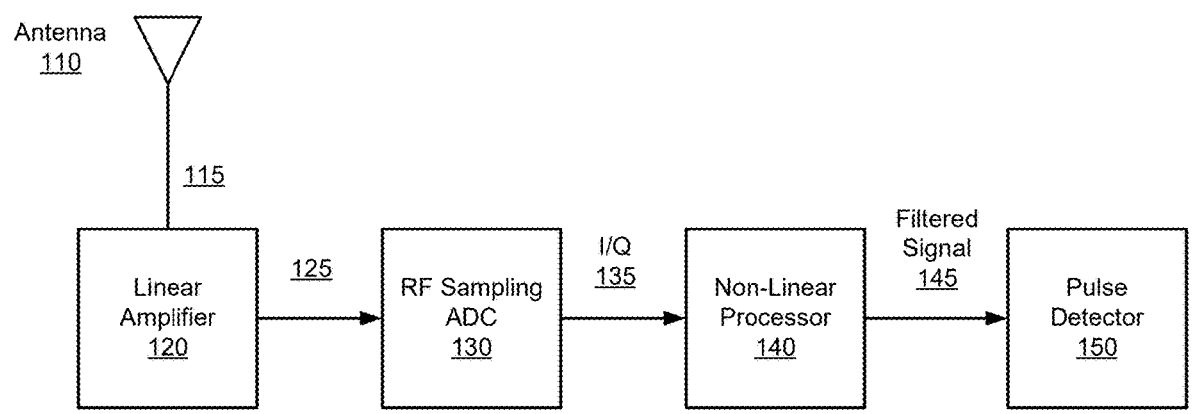
FIG. 1 illustrates a radar receiver including a non-linear processor, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for non-linear filtering of a signal. The techniques may allow for improved pulse detection and pulse width discrimination. As noted above, radar receivers are moving toward increased use of direct digital sampling of RF signals, with log amplifier frontend components being replaced by linear amplifiers. The direct digital sampling analog to digital converters (ADCs) for these systems operate over relatively wide bandwidths. The combination of linear amplifiers and increased bandwidth poses challenges for noise management. Additionally, more stringent receiver design specifications requiring operation over a relatively large dynamic range (e.g., over 65 dB of dynamic range) presents challenges for linear receivers at the lowest signal levels, without the use of automatic gain control. The effects of noise at these lowest signal levels degrade the ability to accurately detect pulses and measure their widths.

To this end, and in accordance with an embodiment of the present disclosure, a non-linear processor is disclosed which utilizes median filtering to provide improved noise reduction of the linearly amplified signal while also maintaining sharp edge transitions on narrower pulses, enabling more accurate pulse width measurement at lower signal to noise ratios. Although the non-linear processor can be used in a number of applications, it is particularly useful in the context of a non-linear receiver processing system, such as a radar receiver.

In accordance with an embodiment, a system implementing the techniques for non-linear filtering includes a first linear filter configured to filter an in-phase component of a received signal to a downsample bandwidth, and a second linear filter configured to filter a quadrature phase component of the received signal to the downsample bandwidth. The system further includes a magnitude calculation circuit coupled to respective outputs of the first linear filter and the second linear filter. The magnitude calculation circuit is configured to generate a magnitude signal based on the filtered in-phase component and the filtered quadrature phase component of the received signal. The system further includes a median filter processor coupled to an output of the magnitude calculation circuit and configured to apply a median filter to the magnitude signal to generate a filtered signal having reduced noise for improved pulse detection and characterization.

It will be appreciated that the techniques described herein may provide improved receiver performance including the ability to simultaneously meet bandwidth, sensitivity, and pulse width discrimination requirements, compared to other methods that utilize linear filters such as, for example, matched filtering, which can oftentimes attenuate narrower pulses of high bandwidth. Numerous embodiments and applications will be apparent in light of this disclosure.

System Architecture

FIG. 1 illustrates a radar receiver 100 including a non-linear processor 140, configured in accordance with certain embodiments of the present disclosure. The radar receiver 100 is shown to include an antenna 110, a linear amplifier 120, an RF sampling ADC 130, a non-linear processor 140, and a pulse detector 150.

The antenna 110 is configured to receive RF signals 115 that have been transmitted from any number of sources. Any number of antenna configurations can be used, such a monopole, dipole, microstrip, patch, and array antennas. More generally, the antenna may be configured to collect signals of interest from a given spectrum. In some examples, the RF signals 115 may include pulsed radar signals or pulse modulated communication signals, although any number of other signals of interest may be similarly processed.

The linear amplifier 120 is configured to amplify the received RF signals 115 in a linear manner (e.g., the output of the amplifier is proportional to the input) as opposed to a logarithmic amplifier, for example, in which the output is proportional to the log of the input which compresses the range of the signal.

The RF sampling ADC 130 is configured to perform direct digital sampling of the linearly amplified RF signal 125, and quadrature mixing for down conversion, to generate a complex digital signal comprising in-phase and quadrature data samples (I/Q data) 135.

Operation of the non-linear processor 140 will be described in greater detail below, but at a high level, the non-linear processor 140 is configured to generate a filtered signal 145 using processing techniques that include non-linear median filtering to provide improved noise reduction.

The pulse detector 150 is configured to operate on the filtered signal 145 to detect pulses and perform pulsewidth measurements which can be used to discriminate or characterize different types of signals, and potentially identify the emitters of those signals. In some embodiments, any suitable pulse detection and discrimination techniques may be employed for this purpose.

In some embodiments, one or more of the linear amplifier 120, the RF sampling ADC 130, the non-linear processor 140, and the pulse detector 150 may be combined or integrated in an RF system-on-a-chip (SoC) architecture. Other examples may have differing degrees of integration, while still other examples may have each of the linear amplifier 120, the RF sampling ADC 130, the non-linear processor 140, and the pulse detector 150 implemented as separate components or circuits that are operatively coupled to one another in a chassis or other higher system level.

Figure 2:
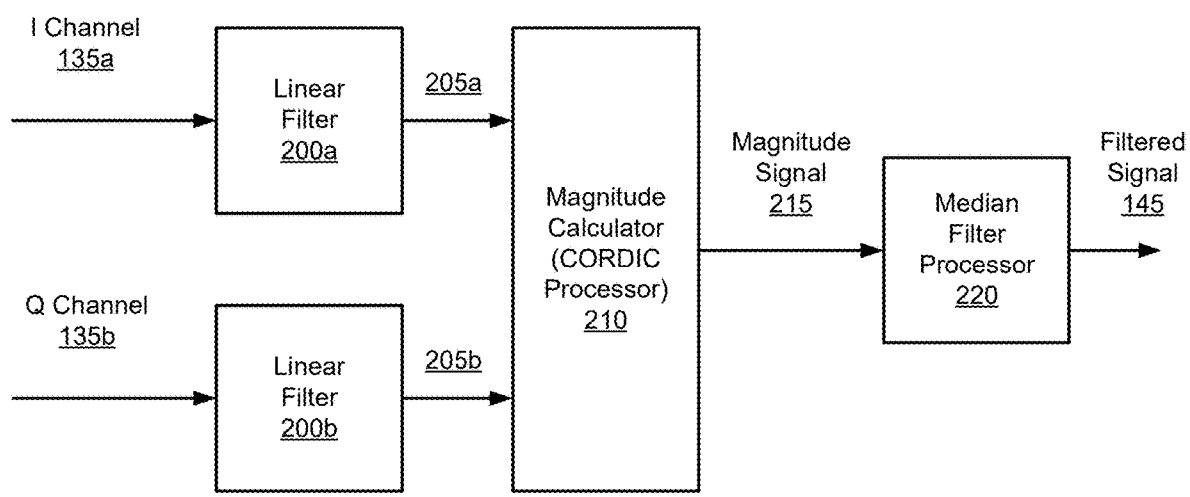
FIG. 2 is a block diagram of the non-linear processor of FIG. 1, configured in accordance with certain embodiments of the present disclosure.

FIG. 2 is a block diagram of the non-linear processor 140 of FIG. 1, configured in accordance with certain embodiments of the present disclosure. The non-linear processor 140 is shown to include a first linear filter 200a, a second linear filter 200b, a magnitude calculator 210, and a median filter processor 220.

The first linear filter 200a is configured to filter the in-phase component 135a of the received signal to a desired bandwidth. In some embodiments, the desired bandwidth may be selected based on the downsampling conversion factor used in the downsampling operation described below. In some embodiments, the first linear filter 200a is implemented as a finite impulse response (FIR) filter.

The second linear filter 200b is configured to filter the quadrature phase component 135b of the received signal to the desired bandwidth. In some embodiments, the second linear filter 200b is implemented as a FIR filter.

The magnitude calculator 210 is coupled to the outputs of the first linear filter 200a and the second linear filter 200b. The magnitude calculator 210 is configured to generate a magnitude or envelope signal 215, based on the filtered in-phase component 205a and the filtered quadrature phase component 205b of the received signal. In some embodiments, the magnitude calculator 210 is implemented as a coordinate rotation digital computer (CORDIC) processor. In some embodiments, the magnitude calculator 210 may be implemented using any suitable approximation technique.

The median filter processor 220 is coupled to the output of the magnitude calculator 210. The median filter processor 220 will be described below in connection with FIG. 3, but at a high level, the median filter processor is configured to apply a median filter to the magnitude signal 215 to generate the non-linear filtered signal 145 with reduced noise to allow for increased sensitivity and pulse width discrimination by the pulse detector 150.

Figure 3:
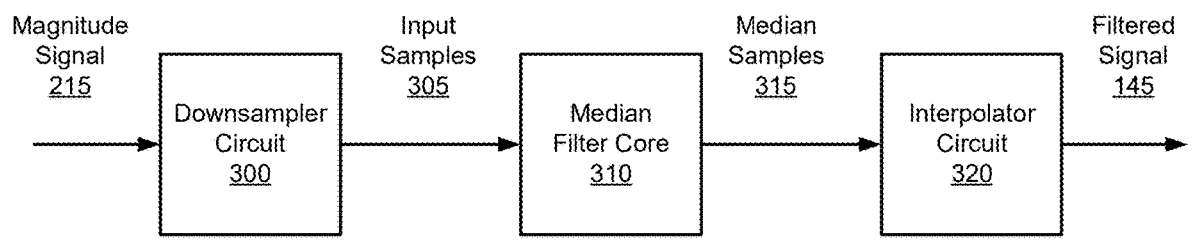
FIG. 3 is a block diagram of the median filter processor of FIG. 2, configured in accordance with certain embodiments of the present disclosure.

FIG. 3 is a block diagram of the median filter processor 220 of FIG. 2, configured in accordance with certain embodiments of the present disclosure. The median filter processor 220 is shown to include a downsampler circuit 300, a median filter core circuit 310, and an interpolator circuit 320.

The downsampler circuit 300 is configured to downsample the magnitude signal 215 by a sampling conversion factor to generate median filter input samples 305 at a reduced sampling rate. In some embodiments, the sampling conversion factor is based on the downsample bandwidth of the linear filters 200. In some embodiments, the downsampler circuit 300 may be omitted if the current sample rate supports the design requirements for the depth of the median filter core circuit, as described below.

The median filter core circuit 310 is configured to calculate median sample values 315 for groups of N samples, the N samples comprising a current median filter input sample 305 and N−1 previous median filter input samples 305, where N is a depth of the median filter core circuit. In some embodiments, N is selected based on a maximum expected duration of pulses in the received signal relative to the median filter sampling rate. In general, the filter depth N affects the computational complexity and the latency of the filter and is selected to be large enough to provide the desired level of noise mitigation, while maintaining an acceptable latency, yet being no greater than the number of samples contained in a pulse of minimum expected duration. A filter depth that exceeds the pulse duration will result in undesirable attenuation of the pulse amplitude. In some embodiments, the filter depth N may be selected to satisfy:

$$N < T_p * F_{rate}$$

Where $T_p$ is the minimum expected pulse duration in seconds and $F_{rate}$ is the median filter sample rate in Hz.

In some embodiments, N is chosen to be an odd number to facilitate the median filtering process, for example to eliminate the need to average the two samples in the middle of the ordered list of samples, to determine the median value.

The median filter may be implemented using any suitable technique. In some embodiments, for example, when the filter sampling rate is low enough to permit, a processor may be used to sort the N values and select the middle value from the sorted list of values. In some other embodiments, for example when the filter sampling rate is too high for a processor-based approach, the median filter may be implemented using hardware logic circuits (e.g., on a field-programmable gate array (FPGA)). One such logic circuit based example, using pipelined comparators, is described below in connection with FIGS. 4 and 5.

The interpolator circuit 320 is configured to upsample the median sample values 315 by the sampling conversion factor to restore the filtered signal to the original sampling rate. In some embodiments, the interpolation process includes upsampling followed by interpolation. In some embodiments, the interpolator circuit 320 may be omitted if it is not necessary to restore the sample rate to the original rate (e.g., the rate of the signal prior to the downsampler circuit 300).

In one example application, the maximum pulse width (e.g., duration) of interest is on the order of 450 ns and the sample rate of the magnitude signal 215, as provided to the median filter processor, is 80 MHz. This results in a pulse that may span up to 36 samples. To reduce the computational complexity of calculating the median value of 36 samples at an 80 MHz rate, the signal may be downsampled by a factor of 4 resulting in a 20 MHz filter sample rate. The band limiting properties of the linear filters 200 allow for such downsampling without aliasing. A median filter of depth N=9 will cover the 450 ns pulse width. The output of the median filter may then be interpolated by a factor of 4 to restore the signal to the original 80 MHz sampling rate, which may be necessary to satisfy the expected input to the pulse detector 150. In some embodiments, the interpolation process includes upsampling followed by interpolation.

As another example, however, if an application required accurate pulse width measurement and discrimination/acceptance of pulses as narrow as 300 ns, but rejection of pulses less than 150 ns, then the median filter of depth N=9 at a sample rate of 20 MHz would partially obscure 300 ns pulses and significantly obscure 150 ns pulses. In this case, the median filter depth may be kept at 9 samples if the down sampling factor is changed from 4 to 2, resulting in a median filter depth which spans 225 ns. This slightly reduces the noise reduction capability of the filter but meets the pulse width discrimination requirements.

Figure 4:
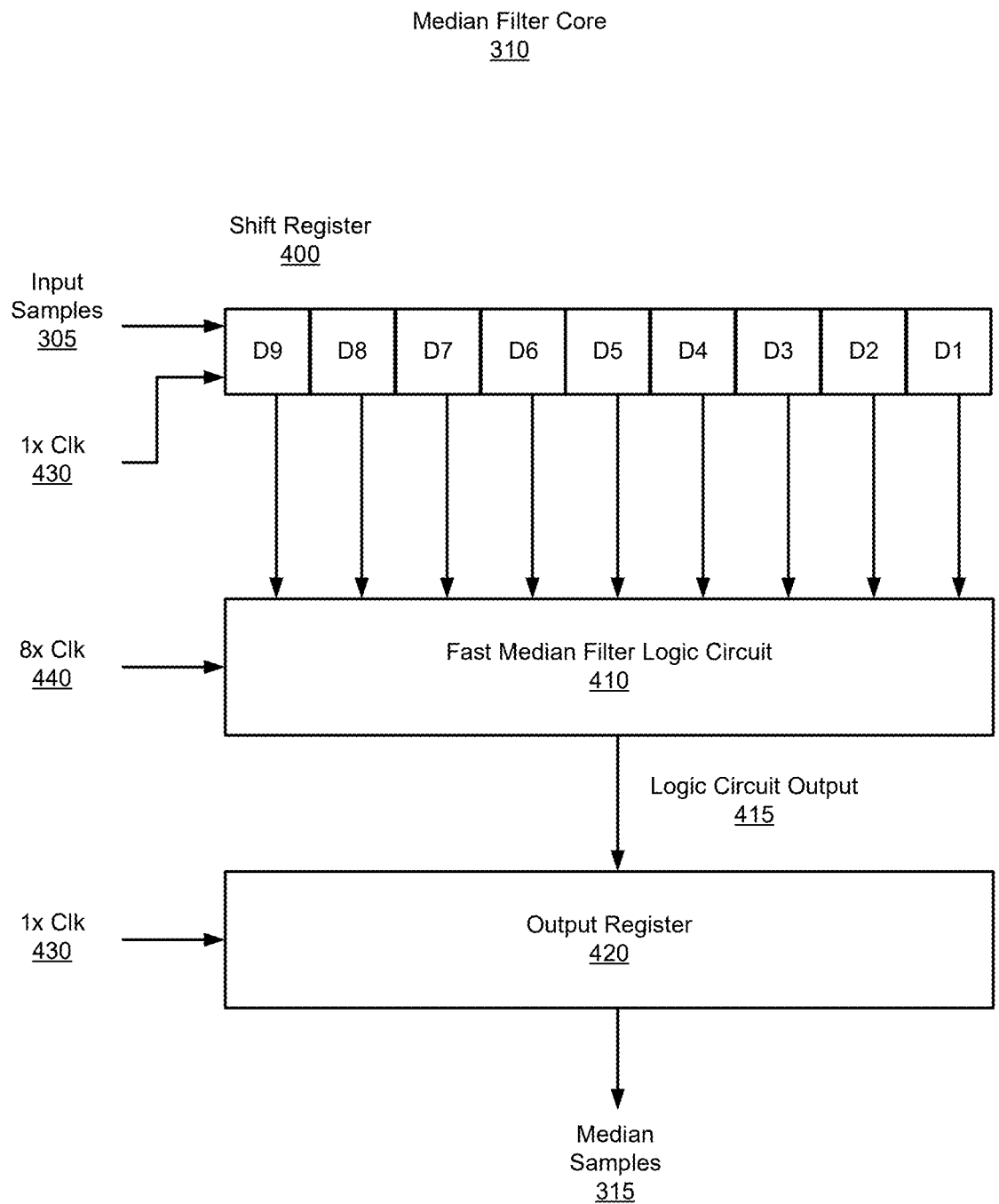
FIG. 4 is a block diagram of the median filter core of FIG. 3, configured in accordance with certain embodiments of the present disclosure.

FIG. 4 is a block diagram of the median filter core 310 of FIG. 3, configured in accordance with certain embodiments of the present disclosure. The median filter core 310 is shown to include a shift register 400, a fast median filter logic circuit 410, and an output register 420.

The shift register 400 is configured to store the current median filter input sample 305 along with the N−1 previous median filter input samples. The median filter input samples 305 are clocked into the shift register 400 based on the 1× clock signal 430 which is the median filter sample rate (e.g., the downsampled sample rate). In this example, the filter depth N=9 and the shift register is shown to be of length 9.

The fast median filter logic circuit 410 is configured to perform a pipelined sequence of comparisons of the N median filter input samples 305 stored in the shift register to generate a logic circuit output 415 that identifies the median value. Operation of the median filter logic circuit 410 will be described below in connection with FIG. 5. In the case of N=9, the fast median filter logic circuit 410 operates at a clock rate provided by an 8× clock signal 440 that is 8 times the 1× clock signal 430.

The output register 420 is configured to latch the currently generated median value 415 for use as the current sample of the median samples 315 to be provided to the interpolator circuit 320 at the 1× clock rate 430.

Figure 5:
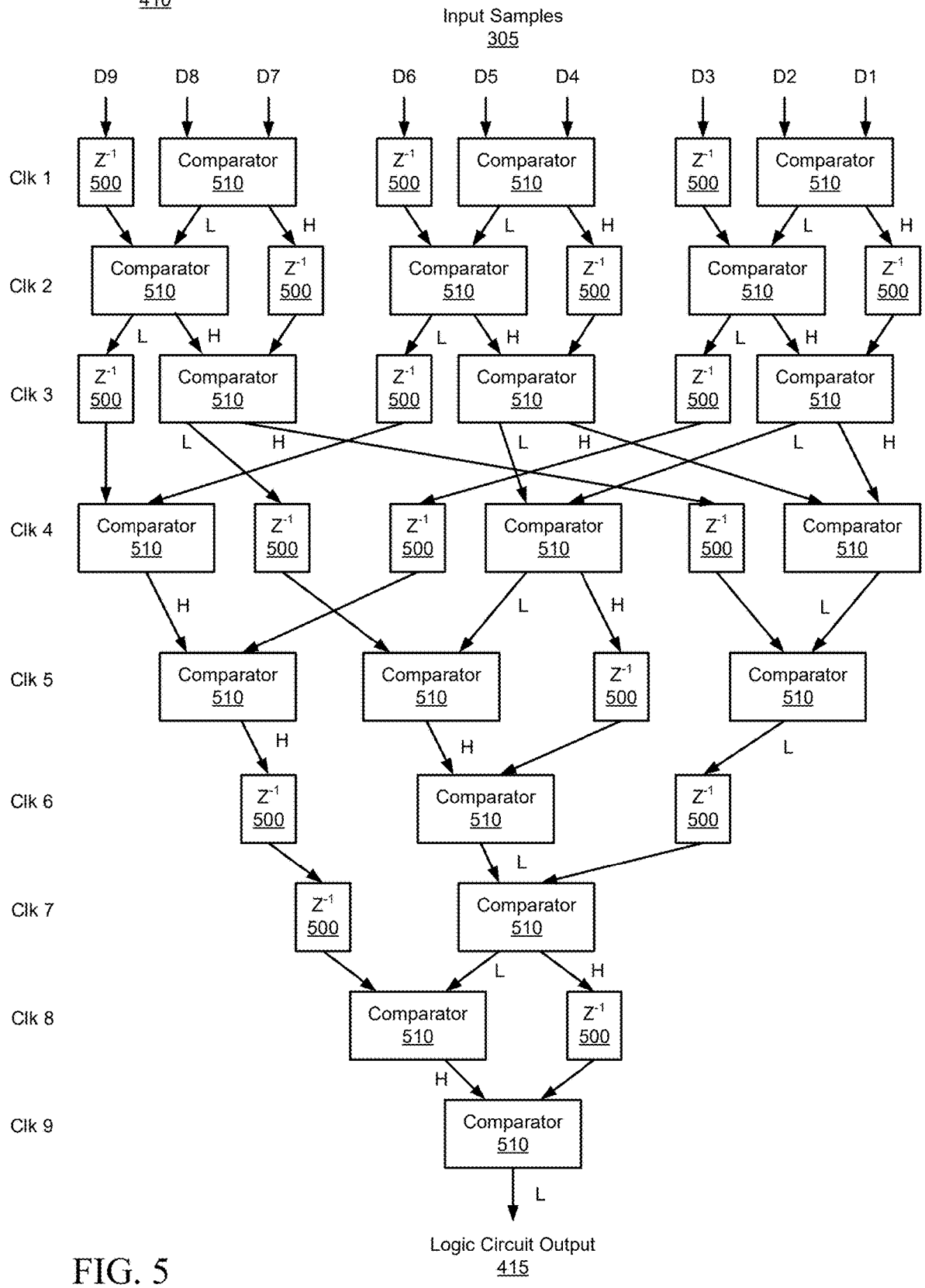
FIG. 5 is a block diagram of the fast median filter logic circuit of FIG. 4, configured in accordance with certain embodiments of the present disclosure.

FIG. 5 is a block diagram of the fast median filter logic circuit 410 of FIG. 4, configured in accordance with certain embodiments of the present disclosure. The fast median filter logic circuit 410 is configured to provide an efficient hardware implementation of a median filter, which utilizes a pipelined series of parallel comparisons of the input samples 305, and which operates at a multiple of the sampling rate of the input samples (e.g., in this case 8× clock 440 which is 8 times the input signal sampling rate). The fast median filter logic circuit 410 is shown to include a pipelined configuration of delay elements ($Z^{-1}$) 500 and comparators 510. The pipeline comprises 9 stages, shown as rows in the figure and the data is passed from one stage to the next on each cycle of the 8× clock signal 440.

The comparators are configured to compare the two inputs values that are provided to the comparator and present the lower of the input values at the "L" output port and the higher of the input values at the "H" output port.

The delay elements 500 are configured to delay the input sample by one cycle of the 8× clock signal before passing that delayed sample down to the next row of logic elements (e.g., comparators and delays) in the pipeline.

After progressing through the pipeline, the output 415 of the final comparator will be the median value of the 9 input samples 305.

Methodology

Figure 6:
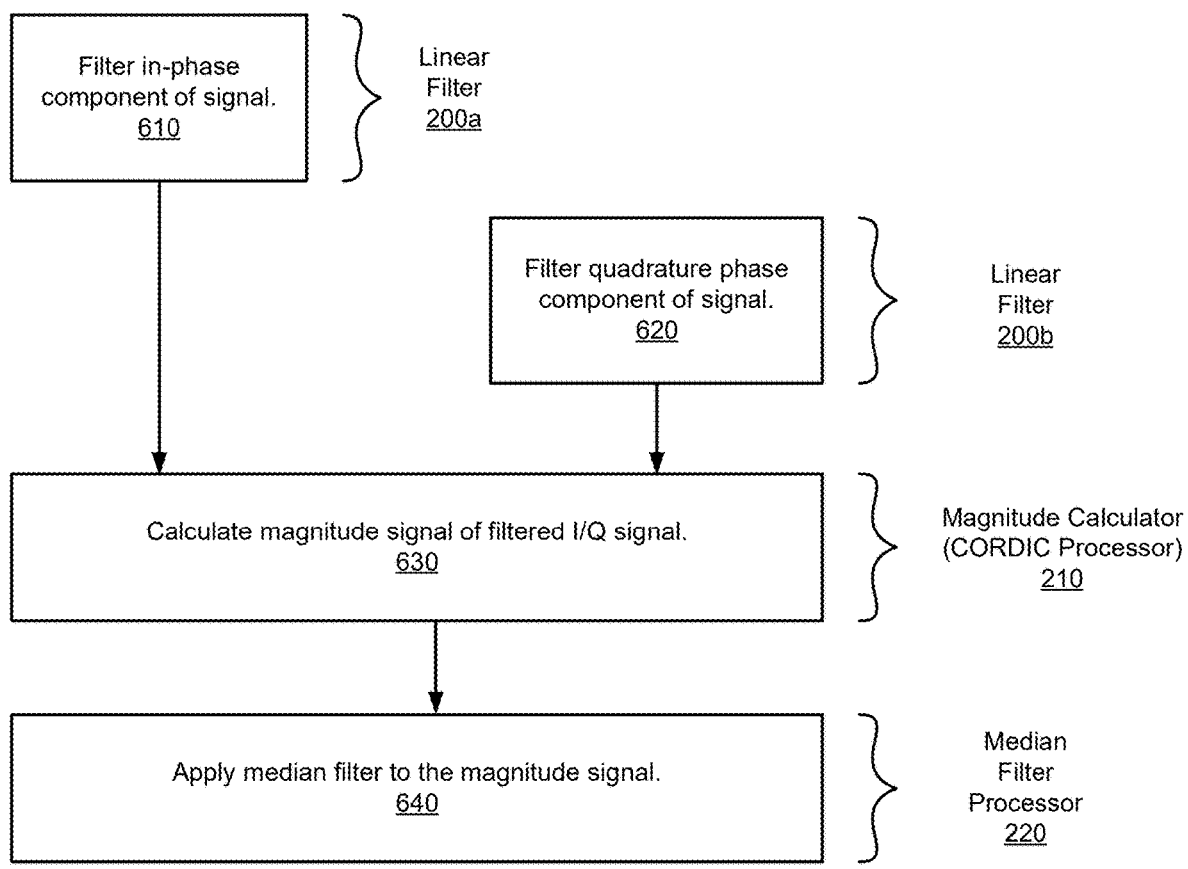
FIG. 6 is a flowchart illustrating a methodology for non-linear processing, in accordance with an embodiment of the present disclosure.

FIG. 6 is a flowchart illustrating a methodology 600 for non-linear processing, in accordance with an embodiment of the present disclosure. As can be seen, example method 600 includes a number of phases and sub-processes, the sequence of which may vary from one embodiment to another. However, when considered in aggregate, these phases and sub-processes form a process for operation of the non-linear processor 140, in accordance with certain of the embodiments disclosed herein, for example as illustrated in FIGS. 1-5, as described above. However other system architectures can be used in other embodiments, as will be apparent in light of this disclosure. To this end, the correlation of the various functions shown in FIG. 6 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 600 commences, at operation 610, by filtering the in-phase component of a received signal to a downsample bandwidth. At operation 620, the quadrature phase component of the received signal is filtered to the downsample bandwidth. In some embodiments, a FIR filter is used to perform the filtering of the I and Q components of the received signal.

At operation 630, a magnitude signal is generated based on the filtered in-phase component and the filtered quadrature phase component of the received signal. In some embodiments, the magnitude is calculated using the CORDIC algorithm. In some embodiments, the magnitude may be calculated using any other suitable approximation technique, including shift-and-add algorithms.

At operation 640, a median filter process is applied to the magnitude signal to generate a filtered signal having reduced noise for improved pulse detection and pulse width discrimination. In some embodiments, the median filter process comprises: (1) downsampling the magnitude signal by a sampling conversion factor to generate median filter input samples at a median filter sampling rate, wherein the sampling conversion factor is based on the downsample bandwidth and the required median filter sample depth; (2) calculating median values for groups of N samples comprising a current median filter input sample and N−1 previous median filter input samples, wherein N is the depth of the median filter; and (3) interpolating the median values by the sampling conversion factor if it is desired to return the signal to its original sample rate prior to the median filter process. In some embodiments, N is selected based on a minimum expected duration of pulses in the received signal relative to the median filter sampling rate. In some embodiments, N is selected to be an odd number to facilitate the median filtering process.

In some embodiments, additional operations may be performed, as previously described in connection with the system. For example, the median values may be calculated using a pipelined sequence of comparisons of the median filter input samples. In other embodiments, the median filter value may be obtained by sorting the input samples into an ordered sequence or list and selecting the middle value in the sorted sequence.

Example System

Figure 7:
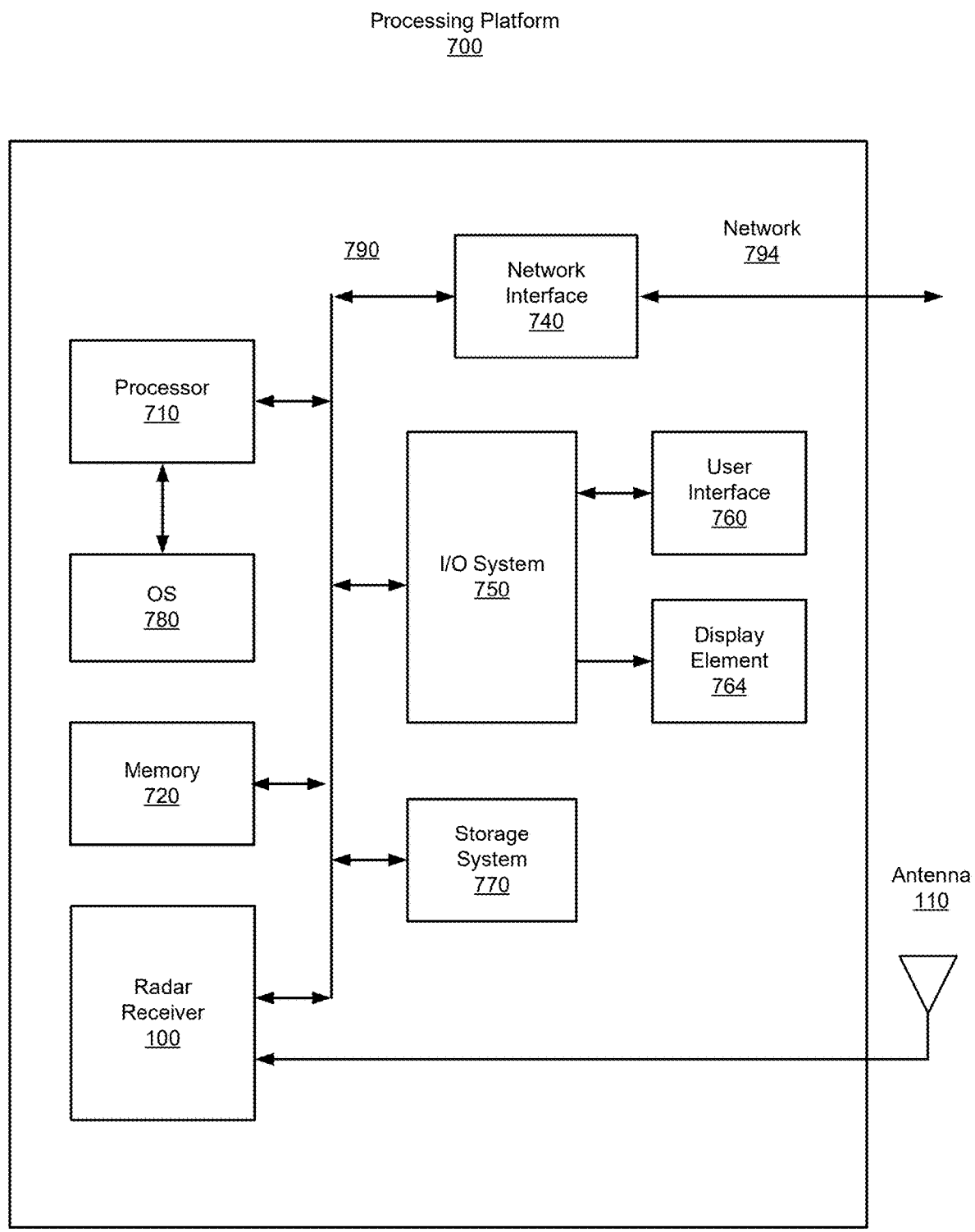
FIG. 7 is a block diagram of a processing platform including a receiver configured to perform non-linear processing, in accordance with an embodiment of the present disclosure.

FIG. 7 is a block diagram of a processing platform 700 including a receiver configured to perform non-linear processing, in accordance with an embodiment of the present disclosure. In some embodiments, platform 700, or portions thereof, may be hosted on, or otherwise be incorporated into a receiver or other electronic systems of an aircraft, ship, ground station, ground vehicle, or man-portable system deployment.

In some embodiments, platform 700 may comprise any combination of a processor 710, memory 720, a network interface 740, an input/output (I/O) system 750, a user interface 760, a display element 764, a storage system 770, radar receiver 100, and antenna 110. As can be further seen, a bus and/or interconnect 790 is also provided to allow for communication between the various components listed above and/or other components not shown. Platform 700 can be coupled to a network 794 through network interface 740 to allow for communications with other computing devices, platforms, devices to be controlled, or other resources. Other componentry and functionality not reflected in the block diagram of FIG. 7 will be apparent in light of this disclosure, and it will be appreciated that other embodiments are not limited to any particular hardware configuration.

Processor 710 can be any suitable processor, and may include one or more coprocessors or controllers, such as an audio processor, a graphics processing unit, or hardware accelerator, to assist in the execution of mission software and/or any control and processing operations associated with platform 700, including operation of the radar receiver 100. In some embodiments, the processor 710 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 710 may be implemented as a complex instruction set computer (CISC) or a reduced instruction set computer (RISC) processor. In some embodiments, processor 710 may be configured as an x86 instruction set compatible processor.

Memory 720 can be implemented using any suitable type of digital storage including, for example, flash memory and/or random access memory (RAM). In some embodiments, the memory 720 may include various layers of memory hierarchy and/or memory caches as are known to those of skill in the art. Memory 720 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 710 may be configured to execute an Operating System (OS) 780 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 700, and therefore may also be implemented using any suitable existing or subsequently-developed platform.

Network interface circuit 740 can be any appropriate network chip or chipset which allows for wired and/or wireless connection between other components of platform 700 and/or network 794, thereby enabling platform 700 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of platform 700. I/O devices may include, but not be limited to, user interface 760 and display element 764. User interface 760 may include devices (not shown) such as a touchpad, operator display unit, keyboard, and mouse, etc., for example, to allow the user to control the system. Display element 764 may be configured to display information to a user. I/O system 750 may include a graphics subsystem configured to perform processing of images for rendering on the display element 764. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 710 or any chipset of platform 700.

It will be appreciated that in some embodiments, the various components of platform 700 may be combined or integrated in a system-on-a-chip (SoC) architecture. In some embodiments, the components may be hardware components, firmware components, software components or any suitable combination of hardware, firmware, or software.

Radar receiver 100 is configured to perform non-linear processing on received RF signals to provide improved pulse detection and pulse width discrimination, as described previously. Radar receiver 100 and non-linear processor 140 may include any or all of the circuits/components illustrated in FIGS. 1-5, as described above. These components can be implemented or otherwise used in conjunction with a variety of suitable software and/or hardware that is coupled to or that otherwise forms a part of platform 700. These components can additionally or alternatively be implemented or otherwise used in conjunction with user I/O devices that are capable of providing information to, and receiving information and commands from, a user.

In various embodiments, platform 700 may be implemented as a wireless system, a wired system, or a combination of both. When implemented as a wireless system, platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a non-linear processing system comprising: a first linear filter configured to filter an in-phase component of a received signal to a downsample bandwidth; a second linear filter configured to filter a quadrature phase component of the received signal to the downsample bandwidth; a magnitude calculation circuit coupled to an output of the first linear filter and an output of the second linear filter, the magnitude calculation circuit configured to generate a magnitude signal based on the filtered in-phase component and the filtered quadrature phase component of the received signal; and a median filter processor coupled to an output of the magnitude calculation circuit and configured to apply a median filter to the magnitude signal to generate a filtered signal having reduced noise.

Example 2 includes the system of Example 1, wherein the first linear filter and the second linear filter are finite impulse response filters, and the magnitude calculation circuit is configured to generate the magnitude using a coordinate rotation digital computer (CORDIC) algorithm.

Example 3 includes the system of Examples 1 or 2, wherein the median filter processor comprises a median filter core circuit configured to calculate median values for groups of N samples comprising a current median filter input sample and N−1 previous median filter input samples, where N is a depth of the median filter core circuit.

Example 4 includes the system of Example 3, wherein the median filter processor comprises: a downsampler circuit configured to downsample the magnitude signal by a sampling conversion factor to generate the median filter input samples at a median filter sampling rate, the sampling conversion factor based on the downsample bandwidth; and an interpolation circuit configured to upsample and filter the median values by the sampling conversion factor.

Example 5 includes the system of Example 4, wherein N is selected based on a minimum expected duration of pulses in the received signal relative to the median filter sampling rate.

Example 6 includes the system of Example 4, wherein N is an odd number.

Example 7 includes the system of Example 4, wherein the median filter core circuit comprises: a shift register configured to store the current median filter input sample and the N−1 previous median filter input samples; and a logic circuit configured to perform a pipelined sequence of comparisons of the median filter input samples stored in the shift register to identify the median value.

Example 8 is a radio frequency system-on-chip (SOC) or receiver comprising the non-linear filtering system of Example 1.

Example 9 is a method for non-linear filtering, the method comprising: filtering an in-phase component of a received signal to a downsample bandwidth; filtering a quadrature phase component of the received signal to the downsample bandwidth; generating a magnitude signal based on the filtered in-phase component and the filtered quadrature phase component of the received signal; and applying a median filter process to the magnitude signal to generate a filtered signal having reduced noise.

Example 10 includes the method of Example 9, comprising: employing a finite impulse response (FIR) filter to perform the filtering of the in-phase component; employing an FIR filter to perform the filtering of the quadrature phase component; and generating the magnitude using a coordinate rotation digital computer (CORDIC) algorithm.

Example 11 includes the method of Examples 9 or 10, wherein the median filter process comprises calculating median values for groups of N samples comprising a current median filter input sample and N−1 previous median filter input samples, where N is a depth of the median filter.

Example 12 includes the method of Example 11, wherein the median filter process comprises: downsampling the magnitude signal by a sampling conversion factor to generate the median filter input samples at a median filter sampling rate, the sampling conversion factor based on the downsample bandwidth; and upsampling and filtering the median values by the sampling conversion factor.

Example 13 includes the method of Example 12, wherein N is selected based on a minimum expected duration of pulses in the received signal relative to the median filter sampling rate.

Example 14 includes the method of Example 12, wherein N is an odd number.

Example 15 includes the method of Example 12, comprising calculating the median values based on a pipelined sequence of comparisons of the median filter input samples.

Example 16 is a computer program product including one or more non-transitory machine-readable mediums encoded with instructions that when executed by one or more processors cause a process to be carried out for non-linear filtering, the process comprising: filtering an in-phase component of a received signal to a downsample bandwidth; filtering a quadrature phase component of the received signal to the downsample bandwidth; generating a magnitude signal based on the filtered in-phase component and the filtered quadrature phase component of the received signal; and applying a median filter process to the magnitude signal to generate a filtered signal having reduced noise.

Example 17 includes the computer program product of Example 16, wherein the process comprises: employing a finite impulse response (FIR) filter to perform the filtering of the in-phase component; employing an FIR filter to perform the filtering of the quadrature phase component; and generating the magnitude using a coordinate rotation digital computer (CORDIC) algorithm.

Example 18 includes the computer program product of Examples 16 or 17, wherein the median filter process comprises calculating median values for groups of N samples comprising a current median filter input sample and N−1 previous median filter input samples, where N is a depth of the median filter.

Example 19 includes the computer program product of Example 18, wherein the median filter process comprises: downsampling the magnitude signal by a sampling conversion factor to generate the median filter input samples at a median filter sampling rate, the sampling conversion factor based on the downsample bandwidth; and upsampling and filtering the median values by the sampling conversion factor.

Example 20 includes the computer program product of Example 19, wherein N is selected based on a minimum expected duration of pulses in the received signal relative to the median filter sampling rate.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A non-linear processing system comprising:
a first linear filter configured to filter an in-phase component of a received signal to a downsample bandwidth;
a second linear filter configured to filter a quadrature phase component of the received signal to the downsample bandwidth;
a magnitude calculation circuit coupled to an output of the first linear filter and an output of the second linear filter, the magnitude calculation circuit configured to generate a magnitude signal based on the filtered in-phase component and the filtered quadrature phase component of the received signal; and
a median filter processor coupled to an output of the magnitude calculation circuit and configured to apply a median filter to the magnitude signal to generate a filtered signal having reduced noise.

2. The system of claim 1, wherein the first linear filter and the second linear filter are finite impulse response filters, and the magnitude calculation circuit is configured to generate the magnitude using a coordinate rotation digital computer (CORDIC) algorithm.

3. The system of claim 1, wherein the median filter processor comprises a median filter core circuit configured to calculate median values for groups of N samples comprising a current median filter input sample and N−1 previous median filter input samples, where N is a depth of the median filter core circuit.

4. The system of claim 3, wherein the median filter processor comprises:
a downsampler circuit configured to downsample the magnitude signal by a sampling conversion factor to generate the median filter input samples at a median filter sampling rate, the sampling conversion factor based on the downsample bandwidth; and
an interpolation circuit configured to upsample and filter the median values by the sampling conversion factor.

5. The system of claim 4, wherein N is selected based on a minimum expected duration of pulses in the received signal relative to the median filter sampling rate.

6. The system of claim 4, wherein N is an odd number.

7. The system of claim 4, wherein the median filter core circuit comprises:
a shift register configured to store the current median filter input sample and the N−1 previous median filter input samples; and
a logic circuit configured to perform a pipelined sequence of comparisons of the median filter input samples stored in the shift register to identify the median value.

8. A radio frequency system-on-chip (SOC) or receiver comprising the non-linear filtering system of claim 1.

9. A method for non-linear filtering, the method comprising:
filtering an in-phase component of a received signal to a downsample bandwidth;
filtering a quadrature phase component of the received signal to the downsample bandwidth;
generating a magnitude signal based on the filtered in-phase component and the filtered quadrature phase component of the received signal; and
applying a median filter process to the magnitude signal to generate a filtered signal having reduced noise.

10. The method of claim 9, comprising:
- employing a finite impulse response (FIR) filter to perform the filtering of the in-phase component;
- employing an FIR filter to perform the filtering of the quadrature phase component; and
- generating the magnitude using a coordinate rotation digital computer (CORDIC) algorithm.

11. The method of claim 9, wherein the median filter process comprises calculating median values for groups of N samples comprising a current median filter input sample and N−1 previous median filter input samples, where N is a depth of the median filter.

12. The method of claim 11, wherein the median filter process comprises:
- downsampling the magnitude signal by a sampling conversion factor to generate the median filter input samples at a median filter sampling rate, the sampling conversion factor based on the downsample bandwidth; and
- upsampling and filtering the median values by the sampling conversion factor.

13. The method of claim 12, wherein N is selected based on a minimum expected duration of pulses in the received signal relative to the median filter sampling rate.

14. The method of claim 12, wherein N is an odd number.

15. The method of claim 12, comprising calculating the median values based on a pipelined sequence of comparisons of the median filter input samples.

16. A computer program product including one or more non-transitory machine-readable mediums encoded with instructions that when executed by one or more processors cause a process to be carried out for non-linear filtering, the process comprising:
- filtering an in-phase component of a received signal to a downsample bandwidth;
- filtering a quadrature phase component of the received signal to the downsample bandwidth;
- generating a magnitude signal based on the filtered in-phase component and the filtered quadrature phase component of the received signal; and
- applying a median filter process to the magnitude signal to generate a filtered signal having reduced noise.

17. The computer program product of claim 16, wherein the process comprises:
- employing a finite impulse response (FIR) filter to perform the filtering of the in-phase component;
- employing an FIR filter to perform the filtering of the quadrature phase component; and
- generating the magnitude using a coordinate rotation digital computer (CORDIC) algorithm.

18. The computer program product of claim 16, wherein the median filter process comprises calculating median values for groups of N samples comprising a current median filter input sample and N−1 previous median filter input samples, where N is a depth of the median filter.

19. The computer program product of claim 18, wherein the median filter process comprises:
- downsampling the magnitude signal by a sampling conversion factor to generate the median filter input samples at a median filter sampling rate, the sampling conversion factor based on the downsample bandwidth; and
- upsampling and filtering the median values by the sampling conversion factor.

20. The computer program product of claim 19, wherein N is selected based on a minimum expected duration of pulses in the received signal relative to the median filter sampling rate.

* * * * *